United States Patent [19]

Besnard et al.

[11] Patent Number: 4,610,430
[45] Date of Patent: Sep. 9, 1986

[54] SELF CLEANING VALVE FOR POWDERY, GRANULAR AND PASTY PRODUCTS

[75] Inventors: Henri Besnard; Daniel Fremau, both of Fecamp, France

[73] Assignees: Trouvay & Cauvin S.A., Le Havre; Aldo Morello, Villeurbianne, both of France; a part interest

[21] Appl. No.: 753,213

[22] Filed: Jul. 9, 1985

[30] Foreign Application Priority Data

Jul. 11, 1984 [FR] France ............................. 84 11042

[51] Int. Cl.$^4$ ...................... F16K 3/316; F16K 25/00
[52] U.S. Cl. ................................ 251/327; 251/326; 137/315; 137/242; 137/244
[58] Field of Search ...................... 137/237, 242, 244; 251/326, 327, 328, 329, 315, 174, 176

[56] References Cited

U.S. PATENT DOCUMENTS

| 572,451 | 12/1896 | Rowe | 251/327 X |
| 2,060,571 | 11/1936 | Hanson | 137/244 |
| 2,669,416 | 2/1954 | Hilton | 251/328 |
| 4,221,307 | 9/1980 | Peterson | 251/328 X |
| 4,356,838 | 11/1982 | Morello | 251/327 X |

FOREIGN PATENT DOCUMENTS 1288374 9/1972 United Kingdom ................ 251/328

Primary Examiner—Martin P. Schwadron
Assistant Examiner—John S. Starsiak, Jr.
Attorney, Agent, or Firm—Michael F. Petock

[57] ABSTRACT

The technical field of the invention is that of guillotine type valves for powdery, granular or pasty products.

The technical problem posed consists in improving the valve disclosed in U.S. Pat. No. 4,356,838, so as to simplify the construction and maintenance thereof and to improve the operation thereof.

According to the invention, the arms (7) of the plate (3) are removable, as well as the sleeve (23) force fitted into the external face of the orifice of the front and rear bodies of the valve. The internal face of each of the bodies (1, 2) is covered with a "duplex" seal (26) and the movable arms of the plate slide with respect to PTFE seals (16, 18). Finally, the abutment member (4) at the end of travel of the plate (3) is made retractable by means of a pneumatic or spring return device.

13 Claims, 5 Drawing Figures

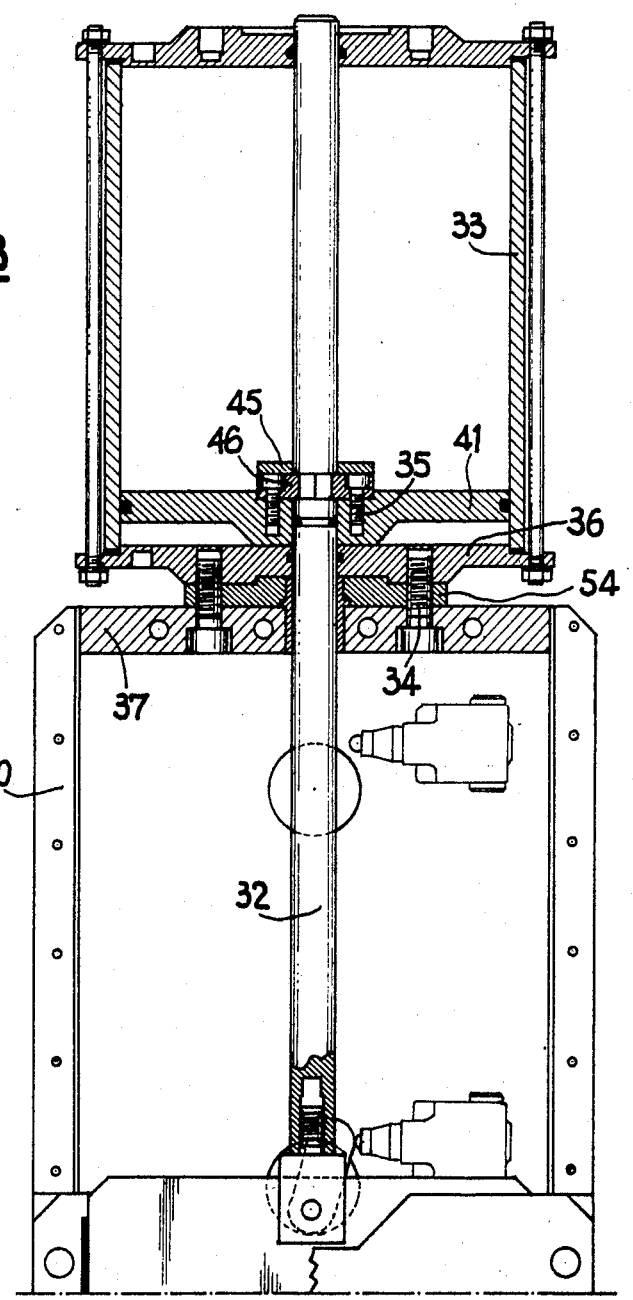

SELF CLEANING VALVE FOR POWDERY, GRANULAR AND PASTY PRODUCTS

CROSS-REFERENCE TO RELATED PATENT

The present invention forms an important improvement to the quillotine valve described and protected by U.S. Pat. No. 4,356,838 issued Nov. 2, 1982. The subject matter of U.S. Pat. No. 4,356,838 is incorporated herein by reference the same as if its teachings were set forth herein at length.

BACKGROUND OF THE INVENTION

U.S. Pat. No. 4,356,838 relates to a guillotine type valve, intended more especially for powdered or granulated products and also for pasty products, such for example as paper pulp. This first invention consisted in forming of a self cleaning valve by adding, on each side of the mobile quillotine plate 2, section members 3 in the form of an elongate rule and more especially longer than the plate, and by bevelling the lower active edge 13 of plate 2 which is applied against an abutment member 4 during closure of the valve.

Now, it has become evident that a few modifications made to this guillotine valve would allow the operation thereof to be considerably improved.

The imperfections noted during construction of the valve according to U.S. Pat. No. 4,356,838 are of several types. First of all, the stellite lining formed on the plate, the abutment member and the slides of the front and rear bodies of the valve only offered a mediocre resistance of these parts to wear. Then, the tightness of the mechanism of the valve with respect to the product was then obtained by the joint effect of a series of different seals, the stacking of which made it difficult to obtain correct clamping of the front and rear bodies of the valve. In particular, two seals were used mounted in two grooves 12 formed on the inner face of each front and rear body of the valve, shoes 7 mounted on springs providing cleaning by wiping the section members 3 as well as an annular stellite lining 19 forming the bearing surface of plate 2 against the internal face of the bodies of the valve.

SUMMARY OF THE INVENTION

The present invention proposes then overcoming these defects of design, by describing new materials for forming the scoop (or plate), abutment member and slides of the valve bodies and by using a single seal covering the internal face of each of the valve bodies formed from a different material so as to facilitate mounting and to improve the seal. This flat seal, which covers the whole of the surfaces prevents the introduction of any abrasive product and ensures minimum friction.

The valve of the present invention further comprises other important advantages.

In order to facilitate the maintenance and repair of the valve on the site where it is installed, the section members added on each side of the guillotine plate are made removable and treated steel sleeves have been mounted in the passage orifices for the fluid in the front and rear bodies of the valve so as to form replaceable linings during maintenance.

Finally, the abutment member receiving the plate (during closure of the valve), has been made mobile so as to allow its retraction at the end of closure. This improvement reinforces the tightness of the valve in the closed position and so improves the general characteristics of the invention.

For this, the abutment member receiving the plate is pierced, in its medium part, with an oblong orifice through which passes a screw defining two endmost positions of the abutment member:

a top position corresponding to the so called "fixed" position of U.S. Pat. No. 4,356,838, in which the semicircular upper edge of the abutment member is flush with the lower periphery of the orifices of the front and rear of the valve;

a low position towards which the abutment member is driven by the action of the plate during closure of the valve, said abutment member being connected to a return device in the top position. On opening, the abutment member follows the plate as far as its "fixed" position, thus avoiding the product from infiltrating into the sliding parts.

Other features and advantages of the present invention will be clear from the following description made with reference to the accompanying drawings.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 1B shows one embodiment of the valve operating mechanism, situated in the extension of the valve body shown in FIG. 1A;

DETAILED DESCRIPTION OF THE PREFERRED EMBODIMENTS

Figure 1A:
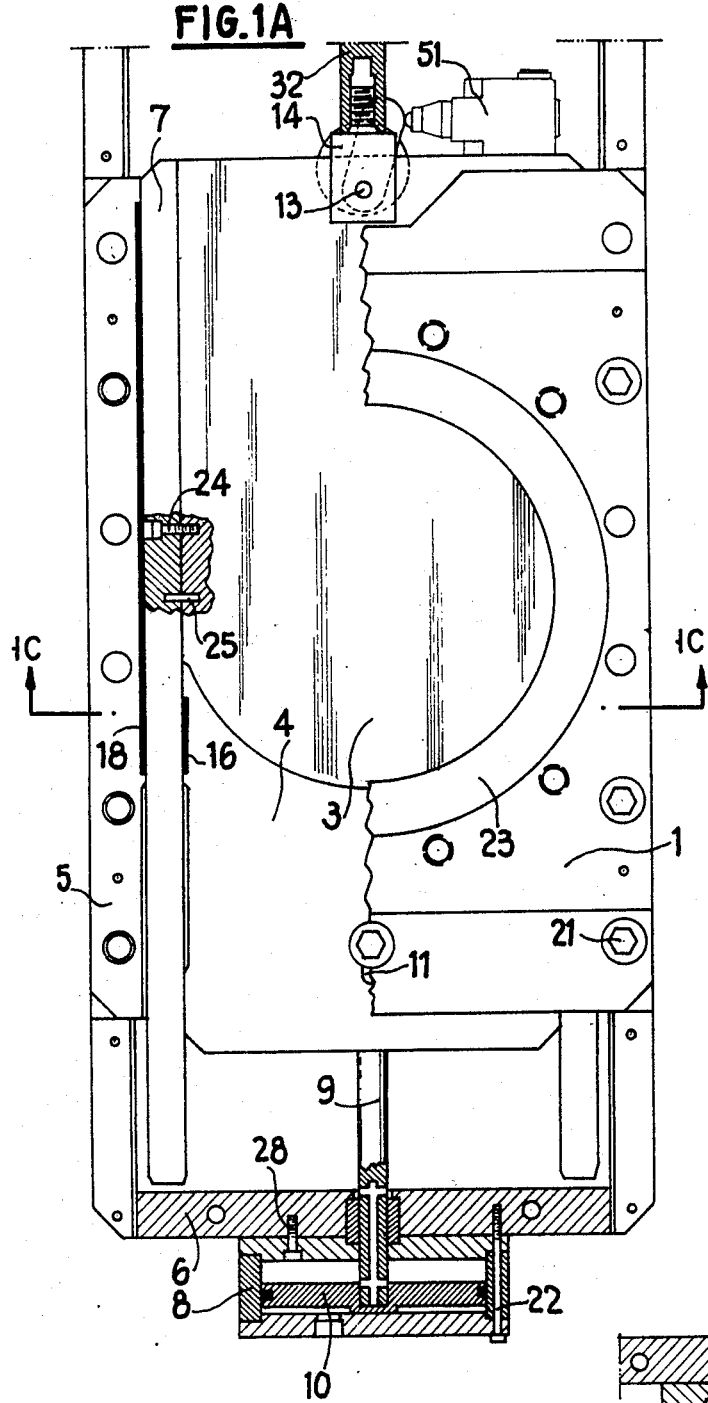
FIG. 1A shows the valve body, in section on the left hand side and in a front view on the right hand side; the abutment member is shown there in the low position.

In FIG. 1A there can be seen the main elements of the guillotine valve, namely the front body 1 of the valve, the plate 3—in the closed position—in contact with the abutment member 4 and the plate arms 7 sliding in slides 5 of bodies 1 and 2.

According to one characteristic of the present invention, the plate arms 7, fixed on each side of the plate or scoop 3, are removable. The plate arms 7 are formed by section members in the form of an elongate rule or member mounted laterally on plate 3. For this, they are fixed by means of at least one centering pin 25 and at least one fastening means which may preferrably be a screw 24. It will be noted that the head of screw 24 is sunk in the plate arm 7 and is accessible when the plate is in the top position, so as to allow easy removal of the plate arm 7.

In a preferred embodiment of the invention, the abutment member 4 is retractable. This is obtained by forming, in the median part of abutment member 4, an oblong orifice 11 through which passes a screw 15 which defines the two endmost positions of the abutment member 4. The threaded part of screw 15 is engaged in the rear body 2 of the valve and its head rests against the front body 1, so as to secure the two bodies simultaneously with respect to each other in the same way as screws 21.

The movement provided for abutment member 4 allows its downward retraction at the end of travel of the plate 3 during closure of the valve. To this end, the side edges of the abutment member are in the form of a tongue sliding in a groove formed in the internal face of the plate arms 7. This sliding connection allows the relative movement of the plate arms 7 with respect to the abutment member 4 during the initial part of closure of plate 3, and during the final part of its opening. At the end of closure and at the beginning of opening, the active edge of the plate remains in contact with the abutment member and this latter accompanies the movement of the plate arms through a return device.

In the embodiment shown in FIG. 1A, the device for returning the movable or mobile abutment member 4 to the top position is formed by a pneumatic cylinder fixed to the bottom piece 6 of the valve.

Figure 2:
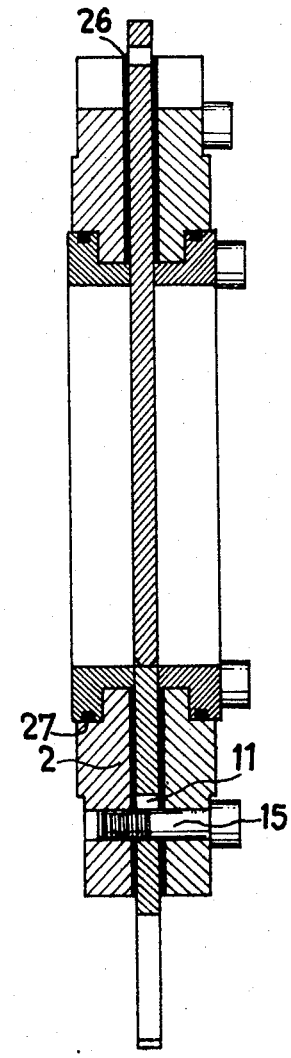
FIG. 2 shows a side view in section of the valve body of FIG. 1A; the abutment member is there however in the top position and is still (or already) in contact with the plate.

This pneumatic cylinder comprises a piston 10 travelling in a cylinder chamber and connected to a rod 9 whose upper end is fixed to the base of the abutment member 4. The pneumatic cylinder is fixed to the bottom piece 6 by means of screws 22, 28. When the lower chamber of the pneumatic cylinder is pressurized, the abutment member 4 is subjected to a vertical return force, transmitted through the rod 9. Thus, during opening of plate 3, the abutment member 4 remains applied against the active edge of the plate until said abutment member has reached the top position (FIG. 2). Beyond, the plate and abutment member separate.

Figure 3:
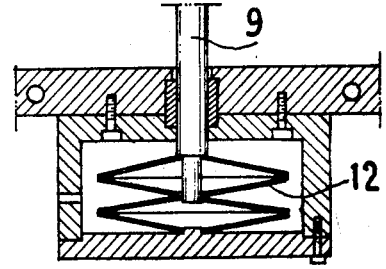
FIG. 3 shows a variant of the device for returning the retractable abutment member to the top position.

In another embodiment of the device for returning the movable or mobile abutment member 4 to the top position (FIG. 3), the pneumatic cylinder is replaced by a set of deformable resilient washers 12 of the BELLE-VILLE washer type. These washers, stacked on each other, are crushed by the rod 9 during the downward movement of abutment member 4 to the low position and then store the return force which will bring the abutment member 4 back to the top positon during opening of plate 3. Any construction principle for placing the set of deformable resilient washers in bearing relation between rod 9 rigidly connected to the mobile abutment member 4 and the body of the valve may be used. It is the intention of the applicant to also protect any other device for returning the movable or mobile abutment member 4 to the top position which operates from the beginning of opening of plate 3, and immediately brings the working edge of said abutment member 4 flush with the lower periphery of the orifices of the front and rear bodies of the valve.

In a preferred embodiment of the invention, a circular removable sleeve 23 made from treated steel is force fitted into the product passage orifices formed in the front and rear bodies of the valve. For this, the circular sleeves have on their periphery a shoulder of a form complementary to that formed in bodies 1, 2. An O-seal 27 is mounted in a groove formed at the periphery of each sleeve. In a preferred embodiment, the sleeves are made from nitrided steel. They are readily replaceable in the case of wear, by simple removal of the worn sleeves and sintering of the new sleeves. This design is very advantageous for repairing the valve.

The tightness of the valve is provided by using exclusively seals made from ethylene polytetrafluoride.

For this, the internal face of each of the front one and rear two bodies of the valve is coated with a flat seal 26 over the whole of its surface. Seal 26 is of the type made from PTFE sintered on a silica bed and known under the name of "duplex" seal.

Figure 1C:
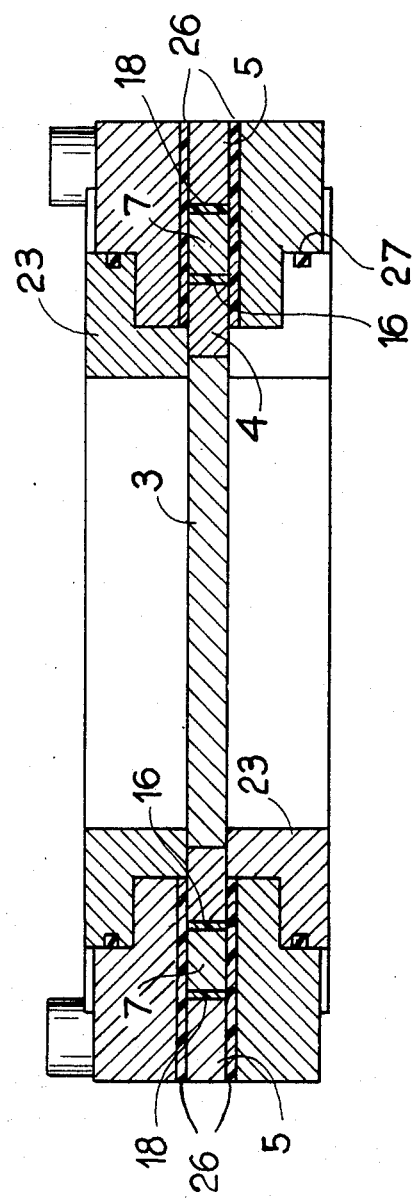
FIG. 1C shows a horizontal cross-sectional view taken along line 1C—1C in FIG. 1A.

Furthermore, as may be seen in FIGS. 1A and 1C, a PTFE seal 18 is inserted in the internal face of each of slides 5 of bodies 1 and 2, and is applies against the external sliding face of the plate arms. These seals 18, housed in a cavity machined in slides 5 provide the tightness of the groove of the slide in which each plate arm slides, and so in a way self cleaning of the valve.

An identical seal 16 is inserted in a cavity formed in each of the external edges of the mobile abutment member 4, for application against the external sliding face of the plate arms and so as to seal the sliding groove of the plate arms 7 with respect to the abutment member 4.

It will be noted that these seals 18 and 16 cooperate with the flat "duplex" seal 26 for providing the whole of the sealing of the valve. This design eliminates the problems of fitting encountered in U.S. Pat. No. 4,356,838.

The materials used for the different sensitive elements of the valve body condition its wear resistance and thus take on a particular importance. In accordance with the present invention, plate 3, abutment member 4 and slides 5 of the valve are made from steel treated by ionic nitridation over a depth of about 2/10ths of a millimeter. In another embodiment, these elements are coated with a chromium oxide deposit. They may also be made from white iron. Tests carried out with these different materials have shown a wear resistance of six months under given conditions of use compared with a wear resistance of about one month obtained with the stellite lining provided in U.S. Pat. No. 4,356,838.

FIG. 1B shows one embodiment of the mechanism for operating plate 3 of the valve of the invention. This mechanism is formed by an actuating cylinder 33 fixed on top of the valve body, to which it is connected by means of two channel members 20 disposed and fixed on each side of a flat connection iron 37. The lower flange 36 of the actuating cylinder 33 is fixed to said flat iron 37 by means of two screws 34 and a support flange 54. Piston 41 of the cylinder is connected to the cylinder rod 32 by means of two connecting screws 35, a thrust ring 45 and a drive washer 46.

The cylinder rod 32 is connected at its lower end to plate 3 by means of the fork joint 14 and the connecting screw 13. Two switches 51 sense each end of travel of plate 3.

In a preferred operating mode, the air pressure is admitted simultaneously into the two lower and upper pneumatic cylinders. It is clear however that, in the upper cylinder, the pressure is reversed for opening and closure of the valve.

The present invention may be embodied in other specific forms without departing from the spirit or essential attributes thereof and, accordingly, reference should be made to the appended claims, rather than to the foregoing specification as indicating the scope of the invention.

We claim:

1. A guillotine valve, comprising a plate movable in translation between a front body and a rear body of the valve, said two bodies each having an orifice formed therethrough which may be selectively masked or uncovered by said plate mounted for sliding between the bodies, said movable plate being provided laterally with two section members in the form of an elongate rule, integral with the plate and longer than said plate, said section members forming arms of said plate and sliding in slides integral with said two bodies of the valve while each filling the whole space of the slides and preventing the product flowing through the valve from penetrating into the slides and accumulating there, said plate arms fixed to the plate being removable and being fixed to said plate by means of at least one centering pin and at least one fastening means.

2. A guillotine valve according to claim 1 including an abutment member for receiving said plate in abuting arrangement and having formed therethrough in its median part, an oblong orifice through which passes a screw or like member defining the two endmost positions of the abutment member, namely:
- a top position in which the semi-circular upper edge of the abutment member is flush with the lower periphery of the orifices of said front and rear bodies of the valve; and
- a low position towards which the abutment member is driven by the action of said plate during closure of the valve, said abutment member being connected to a device for returning it to the top position, holding the abutment member and said plate in contact during the final closure phase and the initial opening phase of the valve.

3. A guillotine valve according to claim 2 wherein said device for returning the movable abutment member to the top position is formed by a pneumatic cylinder fixed to the base of the valve, said pneumatic cylinder being provided with a rod rigidly connected to the movable abutment member.

4. A guillotine valve according to claim 2 wherein said device for returning the movable abutment member to the top position is formed by a set of resilient deformable washers in supporting relations between a rod connected rigidly to the movable abutment member and the body of the valve.

5. A guillotine valve according to any one of claims 1 to 4 including a circular removable sleeve made from treated steel which is force fitted in the external face of the orifices of each of the front and rear bodies of the valve, and an O-seal inserted in an annular groove formed at the periphery of each said sleeve so as to provide sealing between each sleeve and the corresponding body.

6. A guillotine valve according to claim 1 wherein the internal face of each of the front and rear bodies of the valve is covered with a bonded "duplex" seal.

7. A guillotine valve according to claim 1 including an ethylene polytetrafluoride seal inserted in the internal face of the slides and applied against the external sliding face of the arms of the plate.

8. A guillotine valve according to claim 1 including an ethylene polytetrafluoride seal inserted in each of the external side edges of the movable abutment member and applied against the internal sliding face of the arms of the plate.

9. A guillotine valve according to claim 1 wherein the plate, abutment member and slides are made from steel treated by ionic nitridation over a depth of about 2/10ths of a millimeter.

10. A guillotine valve according to claim 1 wherein the plate, abutment member and slides are made from steel coated with a chromium oxide deposit.

11. A guillotine valve according to claim 1 wherein the plate, abutment member and slides are made from white iron.

12. A guillotine valve according to claim 1 wherein the mechanism for operating the plate includes a cylinder fixed to the upper part of the valve, a piston of said cylinder being connected to said plate by means of a connecting rod.

13. A guillotine valve according to claim 1 wherein said fastening means is a screw.

* * * * *